United States Patent
Rotgans et al.

(10) Patent No.: US 11,360,636 B2
(45) Date of Patent: Jun. 14, 2022

(54) DYNAMIC DIMENSION SWITCH FOR 3D CONTENT BASED ON VIEWPORT RESIZING

(71) Applicant: KONINKLIJKE PHILIPS N.V., Eindhoven (NL)

(72) Inventors: Niels Roman Rotgans, Boston, MA (US); Douglas Henrique Teodoro, São Paulo (BR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/348,220

(22) PCT Filed: Nov. 21, 2017

(86) PCT No.: PCT/EP2017/079826
§ 371 (c)(1),
(2) Date: May 8, 2019

(87) PCT Pub. No.: WO2018/095875
PCT Pub. Date: May 31, 2018

(65) Prior Publication Data
US 2019/0324622 A1    Oct. 24, 2019

Related U.S. Application Data

(60) Provisional application No. 62/425,091, filed on Nov. 22, 2016.

(51) Int. Cl.
*G06F 3/0481* (2022.01)
*G06F 3/04815* (2022.01)
(Continued)

(52) U.S. Cl.
CPC ...... *G06F 3/04815* (2013.01); *G06F 3/04845* (2013.01); *G06T 11/206* (2013.01);
(Continued)

(58) Field of Classification Search
CPC ............ G06F 3/04815; G06F 3/04845; G06F 2203/04808; G06F 2203/04806;
(Continued)

(56) References Cited

U.S. PATENT DOCUMENTS 7,400,322 B1    7/2008  Urbach
8,289,329 B2   10/2012  Warntjes
(Continued)

FOREIGN PATENT DOCUMENTS

CN    102044084 A    5/2011
CN    104915974 A    9/2015
(Continued)

OTHER PUBLICATIONS

International Search Report—PCT/EP2017/079826, filed Nov. 21, 2017.

*Primary Examiner* — Phuong H Nguyen (57) ABSTRACT

A computer (10) displays an information data set (22) in a viewport (30) using a first type of rendering (42) when the viewport is in a first viewport geometry space (52), and displays the information data set in the viewport using a second type of rendering (44) when the viewport is in a second viewport geometry space (54). The viewport may be resized by a user. While displaying the first type of rendering, resizing of the viewport into the second viewport geometry space is detected and in response the computer transitions to displaying the information data set using the second type of rendering. Likewise, while displaying the information data set in the viewport using the second type of rendering, resizing of the viewport into the first viewport geometry space is detected and in response the computer transitions to displaying the information data set using the first type of rendering.

13 Claims, 9 Drawing Sheets

(51) Int. Cl.
*G06F 3/04845* (2022.01)
*G06T 11/20* (2006.01)
*G06T 13/20* (2011.01)
*G06T 19/00* (2011.01)

(52) U.S. Cl.
CPC .............. *G06T 13/20* (2013.01); *G06T 19/00* (2013.01); *G06T 2200/24* (2013.01); *G06T 2210/04* (2013.01); *G06T 2219/016* (2013.01)

(58) Field of Classification Search
CPC ....... G06T 11/206; G06T 13/20; G06T 19/00; G06T 2200/24; G06T 2210/04; G06T 2219/016
See application file for complete search history.

(56) References Cited

U.S. PATENT DOCUMENTS

| | | | |
|---|---|---|---|
| 8,560,942 | B2 | 10/2013 | Fortes et al. |
| 8,902,219 | B1 | 12/2014 | Hauswirth et al. |
| 9,317,962 | B2 | 4/2016 | Morato et al. |
| 9,324,188 | B1 | 4/2016 | Fram et al. |
| 9,384,711 | B2 | 7/2016 | Ergan et al. |
| 2007/0029671 | A1 | 2/2007 | Yamasaki |
| 2011/0094184 | A1 | 4/2011 | Gu et al. |
| 2012/0268575 | A1* | 10/2012 | Senuma ............... H04N 13/398 348/51 |
| 2013/0182084 | A1 | 7/2013 | Tsukagoshi et al. |
| 2014/0129990 | A1* | 5/2014 | Xin ..................... G06K 9/6201 715/849 |
| 2014/0245232 | A1* | 8/2014 | Bailiang ............... G06F 3/0488 715/850 |
| 2015/0015671 | A1 | 1/2015 | Kellerman et al. |
| 2017/0005957 | A1* | 1/2017 | Han ........................ H04L 51/04 |

FOREIGN PATENT DOCUMENTS

| | | |
|---|---|---|
| JP | 2010277391 A | 12/2010 |
| JP | 2014092981 A | 5/2014 |

* cited by examiner

DYNAMIC DIMENSION SWITCH FOR 3D CONTENT BASED ON VIEWPORT RESIZING

CROSS-REFERENCE TO PRIOR APPLICATIONS

This application is the U.S. National Phase application under 35 U.S.C. § 371 of International Application No. PCT/EP2017/079826, filed on Nov. 21, 2017, which claims the benefit of U.S. patent application Ser. No. 62/425,091, filed on Nov. 22, 2016. These applications are hereby incorporated by reference herein.

FIELD

The following relates generally to the respiratory arts, mechanical ventilation arts, respiratory monitoring arts, and related arts.

BACKGROUND

Various computer workstations employ an informational display, sometimes referred to as a "dashboard" due to superficial resemblance to a vehicle dashboard. The purpose of a dashboard is to provide the user with an overview of current processes, status of controlled systems, or other computerized operations. In a common dashboard layout, various windows or "viewports" are provided, each of which displays specific information. In the interest of conveying overview information, a viewport is often programmed to display a three-dimensional (3D) rendering of information as 3D is the maximum number of visual dimensions that can be conceptually grasped by the human mind. In some cases the actual data displayed may include more than three dimensions, e.g. a fourth dimension can be added in a parametric view by displaying a set of 3D curves each having a different value of the parameter. Typically, the dashboard is not designed for extensive user interaction, but rather is principally intended as a passive informational source.

An advantage of a computer dashboard over a conventional physical dashboard is that the various viewports can be resized, e.g. by dragging an edge of the viewport window using a mouse or other pointing device. Thus, the user can enlarge viewports that display information of particular importance to the user at any given moment, while reducing in size viewports displaying less pertinent information.

A computer dashboard is a particular application of the disclosure herein. More generally, the improvements to computer technology (e.g. computer workstations) disclosed herein are more generally applicable to any graphical user interface (GUI) viewport that displays a 3D rendering of information. For example, the improvements to computer technology disclosed herein are more generally applicable to a medical imaging computer displaying a 3D image, an architectural workstation displaying a 3D building floorplan, a computer-aided drafting (CAD) workstation displaying a 3D drawing, or so forth.

The following discloses a new and improved systems and methods.

SUMMARY

In one disclosed aspect, a computer comprises a display, a user input device, and an electronic processor programmed to perform operations including: displaying an information data set having at least three dimensions in a viewport shown on the display using a first type of rendering when the viewport has a viewport geometry in a first viewport geometry space; displaying the information data set in the viewport using a second type of rendering different from the first type of rendering when the viewport has a viewport geometry in a second viewport geometry space; resizing the viewport in response to input received via the user input device; while displaying the information data set in the viewport using the first type of rendering, detecting resizing of the viewport to a viewport geometry in the second viewport geometry space and in response transitioning to displaying the information data set in the viewport using the second type of rendering; and while displaying the information data set in the viewport using the second type of rendering, detecting resizing of the viewport to a viewport geometry in the first viewport geometry space and in response transitioning to displaying the information data set in the viewport using the first type of rendering.

In another disclosed aspect, a non-transitory storage medium stores instructions readable and executable by a computer having a display and a user input device to perform operations including: performing a process outputting an information data set having at least three dimensions; displaying the information data set in a viewport shown on the display using a three-dimensional (3D) rendering wherein the viewport has a viewport geometry in a 3D viewport geometry space; and, while displaying the information dataset in the viewport using the 3D rendering, resizing the viewport to a resized viewport geometry in response to input received via the user input device and one of: adjusting the displaying of the information data set in the viewport using the 3D rendering to accommodate the resized viewport geometry if the resized viewport geometry remains in the 3D viewport geometry space, or displaying the information data set in the viewport using a two dimensional (2D) rendering if the resized viewport geometry is in a 2D viewport geometry space.

In another disclosed aspect, a method performed by a computer having a display and a user input device is disclosed. The method comprises: displaying an information data set having at least three dimensions in a viewport shown on the display using a 3D rendering when the viewport has a viewport geometry in a 3D viewport geometry space; displaying the information data set in the viewport using a 2D rendering when the viewport has a viewport geometry in a 2D viewport geometry space; resizing the viewport in response to input received via the user input device; while displaying the information data set in the viewport using the 3D rendering, detecting resizing of the viewport to a viewport geometry in the 2D viewport geometry space and in response transitioning to displaying the information data set in the viewport using the 2D rendering; and while displaying the information data set in the viewport using the 2D rendering, detecting resizing of the viewport to a viewport geometry in the 3D viewport geometry space and in response transitioning to displaying the information data set in the viewport using the 3D rendering.

One advantage resides in providing a computer workstation having an improved dashboard display.

Another advantage resides in providing a computer with a graphical user interface (GUI) with improved handling of information displayed in a 3D viewport.

Another advantage resides in providing a medical imaging computer with improved image display capabilities.

Another advantage resides in providing an architectural workstation with improved building plan display capabilities.

Another advantage resides in providing a computer-aided drafting (CAD) workstation with improved drawing display capabilities.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

In approaches disclosed herein, the resizing of a viewport shown as part of the graphical user interface (GUI) provided by a computer is used as an implicit user input for adjusting the type of rendering used to present an information data set in a viewport. For example, the viewport may initially show a three-dimensional (3D) rendering of the information data set, and the user chooses to resize the viewport to a smaller size for which the 3D rendering is difficult. In response to resizing the viewport, the computer automatically detects that the resized window is non-optimal for the 3D rendering and instead switches to a simpler two-dimensional (2D) rendering that can be more effectively shown in the smaller resized viewport. If the user later resizes the window back to a larger size, this is again automatically detected and the computer switches back to the 3D rendering.

The disclosed approaches of detecting a resized viewport and choosing the best rendering type based on the resized viewport geometry has a number of advantages. The presentation of the information is adjusted automatically in response to resizing the viewport, so that the user does not need to take any additional action beyond the viewport resizing operation. The automated choice of rendering type is optimal for the particular resized viewport geometry, thereby avoiding the possibility of the user manually choosing a non-optimal rendering type. The use of different rendering types for different viewport geometries also avoids scaling a higher informational density rendering to a point where it becomes unreadable. Moreover, by displaying the information data set in a single viewport, with the rendering type chosen automatically based on the viewport geometry, the use of multiple viewports showing different types of renderings of the same information data set (and consequent partially duplicative occupation of valuable display area) is avoided.

Figure 1:
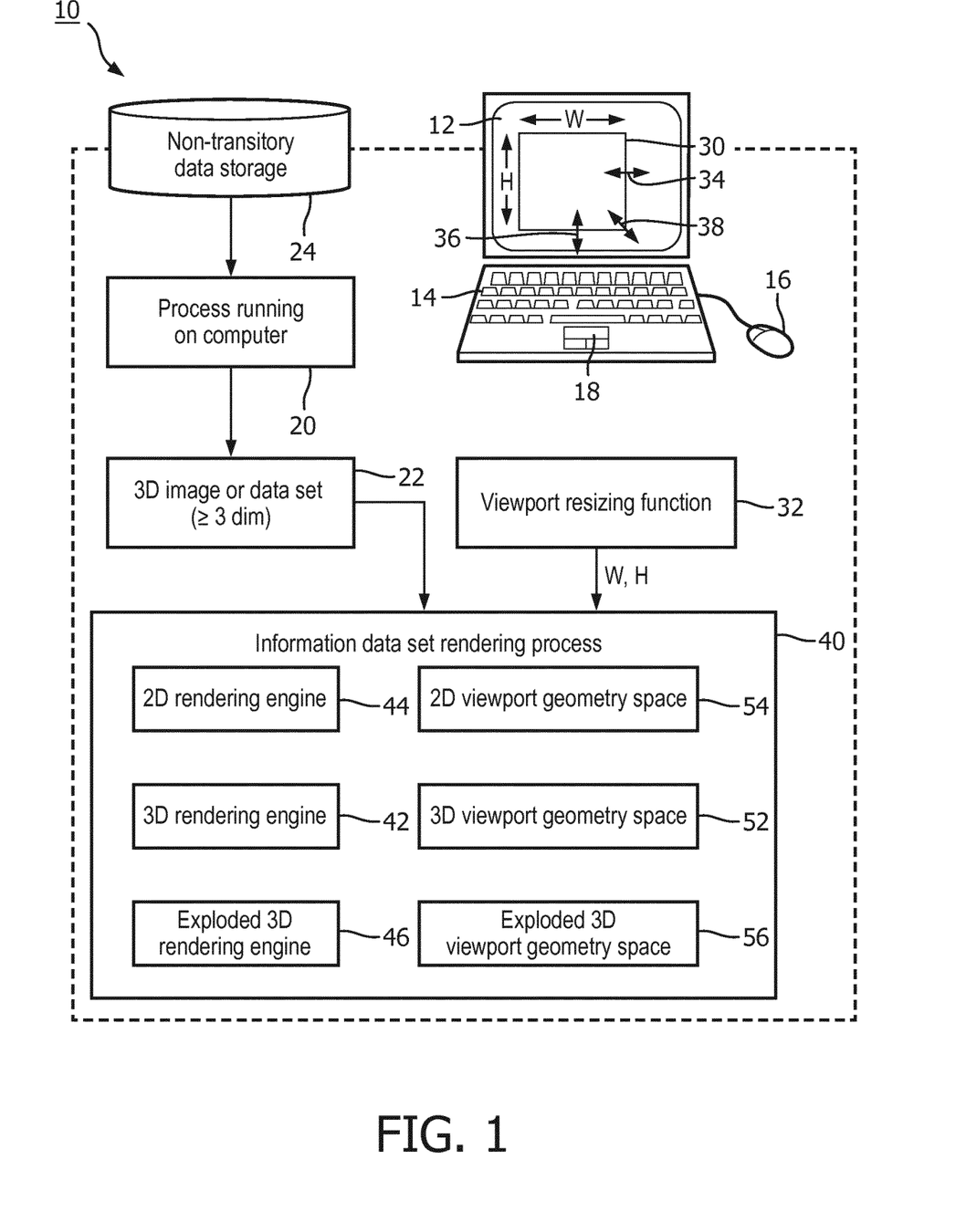
FIG. 1 diagrammatically illustrates a computer with a display and one or more user input devices, which is programmed to perform a process and to provide a graphical user interface (GUI) showing an information data set output by the process in a viewport shown on the display.

With reference to FIG. 1, a computer 10 includes a microprocessor or other central processing unit (CPU, internal component not shown) and further includes or has access to a display 12 (or two or more displays, in some embodiments) and one or more user input devices such as an illustrative keyboard 14, a mouse 16, a trackpad 18, and/or a touch-sensitive overlay of the display 12 (that is, the display 12 may also be a user input device by way of being a touch-sensitive screen). As is known in the art, some of these user input devices such as the mouse 16, trackpad 18, and touch-sensitive display are known as pointing devices because they enable the user to provide input by way of moving a screen icon (sometimes referred to as a mouse pointer, often physically shown as an on-screen arrow) and performing operations such as clicking a button to select an object to which the mouse pointer is pointing, clicking and holding a button and then moving the mouse pointer to drag an object (sometimes called a click-and-drag operation), performing a click-and-drag operation followed by releasing the button to "drop" the object in a certain location on the display (a so-called drag-and-drop operation), clicking a secondary button (often a right button) to bring up a contextual menu whose contents depend in part on the location of the mouse pointer, various combinations thereof, or so forth. It will be appreciated that the detailed user input operations performed depend upon the particulars of the specific pointing device for example, some pointing devices provide more modern input capabilities generally referred to as "gestures", such as spreading the fingers on a mouse pad to cause a selected object to expand in some way.

The computer 10 is programmed to perform a process 20 that outputs an information data set 22 having at least three dimensions. The process 20 can take various forms. For example, in some embodiments the process 20 comprises a three-dimensional (3D) image acquisition process, and the information data set 22 is a 3D image. In these embodiments, the computer 10 may, for example, be an imaging device controller, for example controlling a magnetic resonance imaging (MRI) device, a computed tomography (CT) imaging device, a positron emission tomography (PET) imaging device, or so forth, the process 20 may include a device control process for acquiring imaging data and an image reconstruction process for converting the acquired imaging data into a 3D image, and the information data set 22 is the 3D image.

In other embodiments, the process 20 is an image processing process that retrieves an already-reconstructed 3D image data set from a non-transitory data storage 24 (for example, a Radiology Information System or RIS) and the information data set 22 is the retrieved 3D image. In these embodiments the computer 10 may, for example, be a radiology workstation.

In other embodiments, the process 20 may be a computer-aided drafting (CAD) process and the information data set 22 may be a 3D CAD drawing. Alternatively, the process 20 may be only a CAD drawing viewer process that retrieves the information data set 22 comprising a 3D CAD drawing from the non-transitory data storage 24. In some such embodiments the CAD process may be a mechanical CAD process and the information data set 22 may be a CAD drawing of a machine under development. In some such embodiments the CAD process may be an architectural CAD process and the information data set 22 may be a 3D floor plan of a building. These are merely some more specific examples.

In other embodiments, the process 20 may be a statistical data analysis process, and the information data set 22 may be a multidimensional data set (with at least three dimensions) on which statistical analysis is performed by the process 20. For example, the multidimensional data set may be a set of key performance indicators (KPIs) measured as a function of time (e.g. daily, monthly, quarterly, et cetera). In a variant embodiment the process 20 may be only a data retrieval process that retrieves the multidimensional data set 22 from the non-transitory storage 24 but does not perform statistical analysis on the retrieved multidimensional data.

The foregoing are merely illustrative examples intended to demonstrate the wide range of processes that may constitute (singularly or in various combinations) the process 20 diagrammatically shown in FIG. 1, and intended to demonstrate the wide range of information data sets (with three or more dimensions) that may constitute the information data set 22. In general, it is noted that the non-transitory storage medium 24 may, by way of non-limiting illustration, comprise a hard disk or other magnetic storage medium, an optical disk or other optical storage medium, a flash memory, solid state drive (SSD) or other electronic storage medium, various combinations thereof, or so forth.

With continuing reference to FIG. 1, the computer 10 is programmed to perform the process 20 that outputs the information data set 22, and is further programmed to display a rendering of the information data set 22 in a viewport 30. The term "viewport" as used herein encompasses any defined portion of the area of the display 12 that is designated for displaying the rendering of the information data set 22. The viewport 30 may be referred to by various nomenclatures, by various graphical user interface (GUI) vendors or users. For example, in some settings the viewport 30 may be referred to as a "window" or as a "GUI window", or similar nomenclature. In some embodiments, the viewport 30 is created using a suitable function or subroutine of a GUI desktop environment, such as Microsoft Windows (available from Microsoft Corporation, Redmond Wash., USA), Mac Os X (available from Apple Inc., Cupertino, Calif., USA), or one of the various Linux desktop environments such as the GNU Network Object Model Environment (GNOME). The detailed implementation of the viewport 30 may differ depending upon the GUI desktop environment. For example, some GUI desktop environments define screen coordinates for the display 12 and separate viewport coordinates for the viewport 30. However defined, the viewport 30 has dimensions, usually rectangular dimensions suitably designated by a height "H" and a width "W" as indicated in FIG. 1. The viewport 30 in general has some default dimensions and the computer 10 will initially present the viewport 30 on the display 12 with the viewport 30 having those default dimensions for width "W" and height "H". However, as discussed later herein, the viewport 30 is resizable by user input.

In some embodiments, the viewport 30 is one viewport of a set of viewports collectively forming an informational dashboard (not shown) presenting the information data set 22 in the viewport 30 and presenting other information data sets in other viewports of a set of viewports (including viewport 30) that make up the dashboard. However, this is merely one illustrative embodiment, and in other embodiments the viewport 30 may be displayed, utilized, and manipulated as disclosed herein as an isolated GUI object or as a part of an overall GUI display layout other than an informational dashboard.

The viewport 30 in general has some default dimensions and the computer 10 will initially show the rendering of the information data set 22 in the viewport 30 on the display 12 with the viewport 30 having those default dimensions for width "W" and height "H". However, in accordance with a typical GUI desktop environment (e.g., Microsoft Windows, Mac Os X, or various Linux desktop environments), the viewport 30 is resizable by user input. To this end, the computer 10 executes a viewport resizing function or subroutine 32 (usually a function or subroutine provided as part of the GUI desktop environment) by which the computer 10 resizes the viewport 30 in response to input received via a user input device. For example, using one of the pointing devices 16, 18 or using a touch-sensitive screen, the user may select the right edge of the viewport 30 (thus turning the mouse pointer into a horizontal double-arrow icon 34) and drag-and-drop this edge to a different location, thus resizing particularly the width "W" of the viewport 30. In another possible user input, the user may select the bottom edge of the viewport 30 (thus turning the mouse pointer into a horizontal double-arrow icon 36) and drag-and-drop this edge to a different location, thus resizing particularly the height "H" of the viewport 30. In some embodiments, the user may select the lower-right corner of the viewport 30 (thus turning the mouse pointer into an angled double-arrow icon 38) and drag-and-drop this corner to a different location, thus simultaneously resizing both the width "W" and the height "H" of the viewport 30. Other types of user input may be employed depending upon the user input capabilities of the GUI environment for example, a widening gesture may be employed by selecting the viewport 30 and placing fingers on the trackpad 18 and spreading the fingers apart on the trackpad 18 to widen the width "W" of the viewport 30. As another example, some viewports include a toolbar at the top (usually) with selectable icons—in such embodiments, there may be a "full screen" icon selectable to cause the viewport 30 to resize or expand to its maximum permissible size.

Execution of the viewport resizing GUI function or subroutine 32 by the computer 10 causes the viewport 30 to be resized to a different viewport geometry. In the illustrative embodiment, the viewport 30 is a rectangular viewport having a width "W" and a height "H". Thus, the viewport geometry is defined by the width "W" and height "H", or may be defined by other, equivalent representations such as the viewport area A (where A=W×H) and the viewport aspect ratio R (which could be represented either as R=W/H or as R=H/W). Typically, the user has the option to resize the viewport 30 at any time.

The viewport 30 may have various other properties or characteristics depending upon and as supported by the GUI desktop environment. For example, some GUI desktop environments employ a concept of "focus", where different viewports may overlap and a viewport brought into focus (by clicking on it with the mouse 16, for example) is shown "on top" with the viewport in focus covering up any underlying viewports.

With continuing reference to FIG. 1, the computer 10 further executes an information data set rendering process 40, which renders the information data set 22 in the viewport 30 on the display 12. The information data set rendering process 40 performs the rendering of the information data set 22 using a chosen rendering engine. The illustrative information data set rendering process 40 includes (or has access to via a suitable function or subroutine call) three rendering engines: a 3D rendering engine 42; a 2D rendering engine 44; and an exploded 3D rendering engine 46. These are merely illustrative examples, and a given embodiment of the information data set rendering process 40 may include or have callable access to a sub-set of these engines 42, 44, 46 and/or may include or have callable access to one or more other rendering engines. In particular, some embodiments expected to be commercially useful may omit inclusion or access to the exploded 3D rendering engine 46.

Each illustrative rendering engine 42, 44, 46 is of a different type. In the following, some suitable rendering engines are described merely as illustrative examples. The 3D rendering engine 42 may, for example, be a 3D image rendering engine that shows a perspective view of the 3D image from a chosen vantage point. Such a rendering engine may be appropriate if the information data set 22 is a 3D image (e.g. an MRI, CT, or PET image as mentioned previously). Such 3D image rendering engines are known and used in respective MRI, CT, and PET medical imaging systems, as examples. The 3D rendering may incorporate partial transparency so as to allow visualization of internal components. If the 3D image is segmented (e.g. to delineate the heart, vasculature, or some other tissue or organ in the case of a medical image), then the 3D image may be color coded to highlight such segmented features. In another embodiment, the information data set 22 may be a CAD drawing and the 3D image rendering engine 42 may be a 3D CAD viewer engine, which again may provide for partial transparency to visualize internal components, and/or employ color-coding of specific machine components. In the case of an architectural CAD drawing as the information data set 22, the CAD viewer may show floors of the 3D rendering of a building floor plan with partial transparency, and/or with color coding to highlight certain areas. In the case of the information data set 22 comprising KPIs or other statistical data, the 3D rendering engine 42 may be a 3D plotting engine that plots data in a 3D x-y-z coordinate system with each of x, y, and z assigned to a specific data dimension. If the information data set 22 has a fourth dimension, this may be represented by parameterization, i.e. plotting a curve or surface for several discrete values of the fourth dimension. Again, these are merely illustrative examples.

It will be particularly appreciated that most 3D rendering approaches are relatively complex, as they must show enough pixels to provide the viewer with the ability to visualize the intended 3D representation. Thus, the 3D rendering engine 42 will be most effective in situations in which the size of the viewport 30 is large and in which its aspect ratio is reasonably close to 1:1. If the user resizes the viewport to a viewport geometry which is small (H×W being small) or of high aspect ratio (one of H or W being small compared with the other) then the 3D rendering may be difficult to visually comprehend.

The 2D rendering engine 44 may, for example, be a 2D image rendering engine that shows a side or top view of a 3D image from a chosen vantage point. Such a rendering engine may be appropriate if the information data set 22 is a 3D image. In another embodiment, the 2D rendering may be a maximum intensity projection (MIP). In another embodiment, the 2D rendering may be a single slice taken out of the 3D image volume. Such 2D image rendering engines are known and used in respective MRI, CT, and PET medical imaging systems, as examples. If the 3D image is segmented (e.g. to delineate the heart, vasculature, or some other tissue or organ in the case of a medical image), then the 2D rendering may be color coded to highlight such segmented features, if such coding can be done in the 2D context without producing confusion or undue ambiguity. In another embodiment, the information data set 22 may be a CAD drawing and the 2D image rendering engine 44 may represent a top or side view of the CAD drawing. In another embodiment, the 2D image rendering may be a sectional view with shading or the like indicating cut surfaces. Again, color-coding may be employed to identify specific machine components. In the case of an architectural CAD drawing as the information data set 22, the 2D rendering may show a single floor of the building, optionally with color coding to highlight certain areas. In the case of the information data set 22 comprising KPIs or other statistical data, the 2D rendering engine 42 may be a 2D plotting engine that plots data in a 2D x-y coordinate system with each of x and y assigned to a specific data dimension. Parametric curves may be used to represent one or more additional dimensions. Again, these are merely illustrative examples.

It will be particularly appreciated that most 2D rendering approaches are less complex than 3D renderings of the same 3D data set. The 2D rendering generally requires fewer pixels to provide the viewer with the ability to visualize the intended 2D representation, as compared with the more complex 3D rendering. Thus, the 2D rendering engine 44 may be more effective than the 3D rendering engine 42 in situations in which the size of the viewport 30 is small and/or the viewport 30 has a high aspect ratio.

The exploded 3D rendering engine 46 may be used for certain types of information data sets 22 such as CAD drawings or 3D images generated as a stack of slices. Exploded 3D renderings are well-known in CAD technology, and any such exploded 3D rendering engine may be used as the 3D rendering engine 46. In general, as the CAD drawing identifies different components, these components can be rendered spaced apart from one another so as to reduce the likelihood of overlap between components. Likewise, in a stack of image slices, the slices of the stack may be moved away from one another and shown in a perspective view so that all slices can be seen (at least in part) from a given vantage point.

It will be particularly appreciated that most exploded 3D rendering approaches occupy more space than the equivalent 3D rendering, since the "explosion" of the components or image slices entails inserting additional space between the neighboring components or slices. Thus, the 3D rendering engine 46 may be most effective when the viewport 30 is large so as to accommodate the exploded 3D rendering.

As disclosed herein, the information data set rendering process 40 renders the information data set 22 in the viewport 30 on the display 12 using a selected one of the different rendering engines 42, 44, 46. The information data set rendering process 40 decides which rendering engine to use based on the current viewport geometry of the viewport 30. As previously noted, the viewport 30 is typically initialized with some default viewport geometry (e.g. default "H" and "W" values), and the rendering engine is initially chosen by the information data set rendering process 40 for that default viewport geometry. Thereafter, the computer 10 is programmed to input the resized viewport geometry (e.g. the updated values of "W" and "H" for the resized viewport 30) to the information data set rendering process 40 in response to any viewport resizing operation performed on the viewport 30 by the viewport resizing function 32. This can be done in various ways depending upon the GUI desktop environment, e.g. by way of an onresize(V) event detection incorporated into the information data set rendering process 40 (where V is a variable indicating the viewport 30) or some other equivalent (programming language-dependent) viewport or window resizing event detection expression.

With continuing reference to FIG. 1, the information data set rendering process 40 includes, for each respective rendering engine 42, 44, 46, a corresponding definition of a viewport geometry space 52, 54, 56.

Thus, the 3D rendering engine 42 has a corresponding 3D viewport geometry space 52, and the information data set rendering process 40 chooses to render the information data set 22 in the viewport 30 using the 3D rendering engine 42 if the (resized) viewport 30 has a viewport geometry in the viewport geometry space 52.

Similarly, the 2D rendering engine 44 has a corresponding 2D viewport geometry space 54, and the information data set rendering process 40 chooses to render the information data set 22 in the viewport 30 using the 2D rendering engine 44 if the (resized) viewport 30 has a viewport geometry in the 2D viewport geometry space 54.

If the information data set rendering process 40 also includes or has callable access to the exploded 3D rendering engine 46, then the information data set rendering process 40 chooses to render the information data set 22 in the viewport 30 using the exploded 3D rendering engine 46 if the (resized) viewport 30 has a viewport geometry in the exploded 3D viewport geometry space 56.

In general, each viewport geometry space 52, 54, 56 is chosen to span the range of viewport geometries for which the corresponding rendering engine 42, 44, 46 is the best engine for providing a readily comprehended representation of the information data set 22. As previously discussed, in general the 3D rendering engine 42 is more effective for larger viewport geometries and for viewport geometries that do not have a large aspect ratio; whereas, the 2D rendering engine 44 provides a more easily comprehended rendering that is more effective for smaller and/or higher aspect ratio viewport geometries. The exploded 3D rendering engine 42, if provided, is most effective for the largest viewport geometries.

Accordingly, in some embodiments the 3D viewport geometry space 52 and the 2D viewport geometry space 54 are distinguished by criteria including one or more of: a 3D/2D viewport area transition criterion; a 3D/2D viewport width criterion; a 3D/2D viewport height criterion. For example, the 3D viewport geometry space 52 may encompass all viewport geometries having area (H×W) greater than some threshold, and the 2D viewport geometry space 54 may encompass all viewport geometries having area less than this threshold. Additionally or alternatively the 3D viewport geometry space 52 may encompass all viewport geometries having both H and W greater than some threshold, and the 2D viewport geometry space 54 may encompass all viewport geometries having either H or W less than that threshold. In another variant, different thresholds may be used for H and W. The 3D and 2D geometry spaces 52, 54 may also be distinguished by criteria dependent on size of the information data set. This takes into account that a larger information data set usually requires more pixels to provide a meaningful 3D rendering as compared with a smaller information data set—thus, the aforementioned thresholds may be made dependent on the size of the information data set 22 to be rendered.

If the exploded 3D rendering engine 46 is available, then the corresponding exploded 3D viewport geometry space 56 is generally larger than the 3D viewport geometry space 52, e.g. the exploded 3D viewport geometry space 56 may be defined as spanning all viewport areas which are greater than some threshold.

As an illustrative example, one possible algorithm by which the information data set rendering process 40 may choose the rendering engine (in this example only the 3D rendering engine 42 and the 2D rendering engine 44 are available) is:

if(W>H) and (H≥200) and (W≥580) then choose 3D rendering engine 42;
if(W<H) choose 2D rendering engine 44;
if(H<200) choose 2D rendering engine 44;
if(W<580) choose 2D rendering engine 44;

Again, this is merely an illustrative example.

Figure 2:
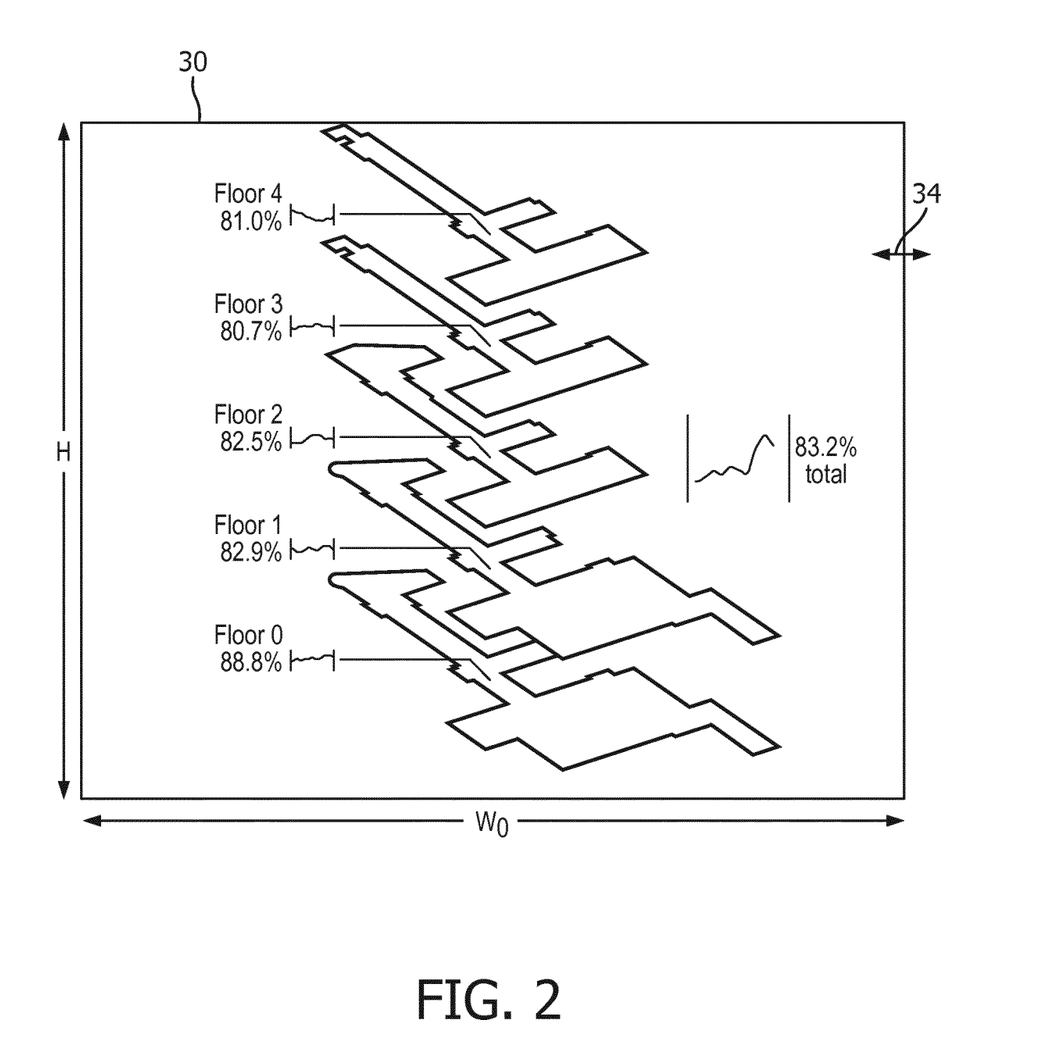
FIGS. 2-5 diagrammatically illustrates a time series of depictions of the viewport shown by the computer of FIG. 1 demonstrating handling of resizing of the viewport in accordance with input received via the one or more user input devices.
Figure 3:
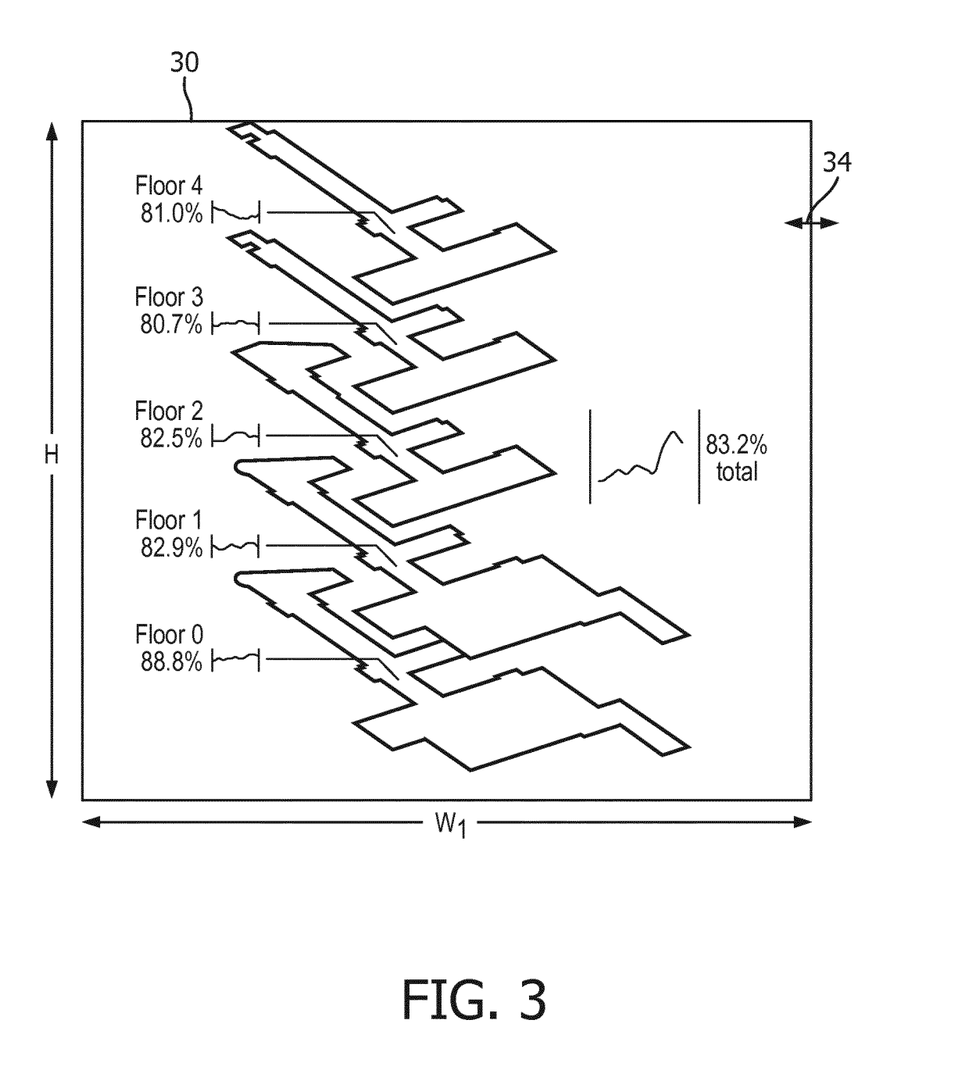
Figure 4:
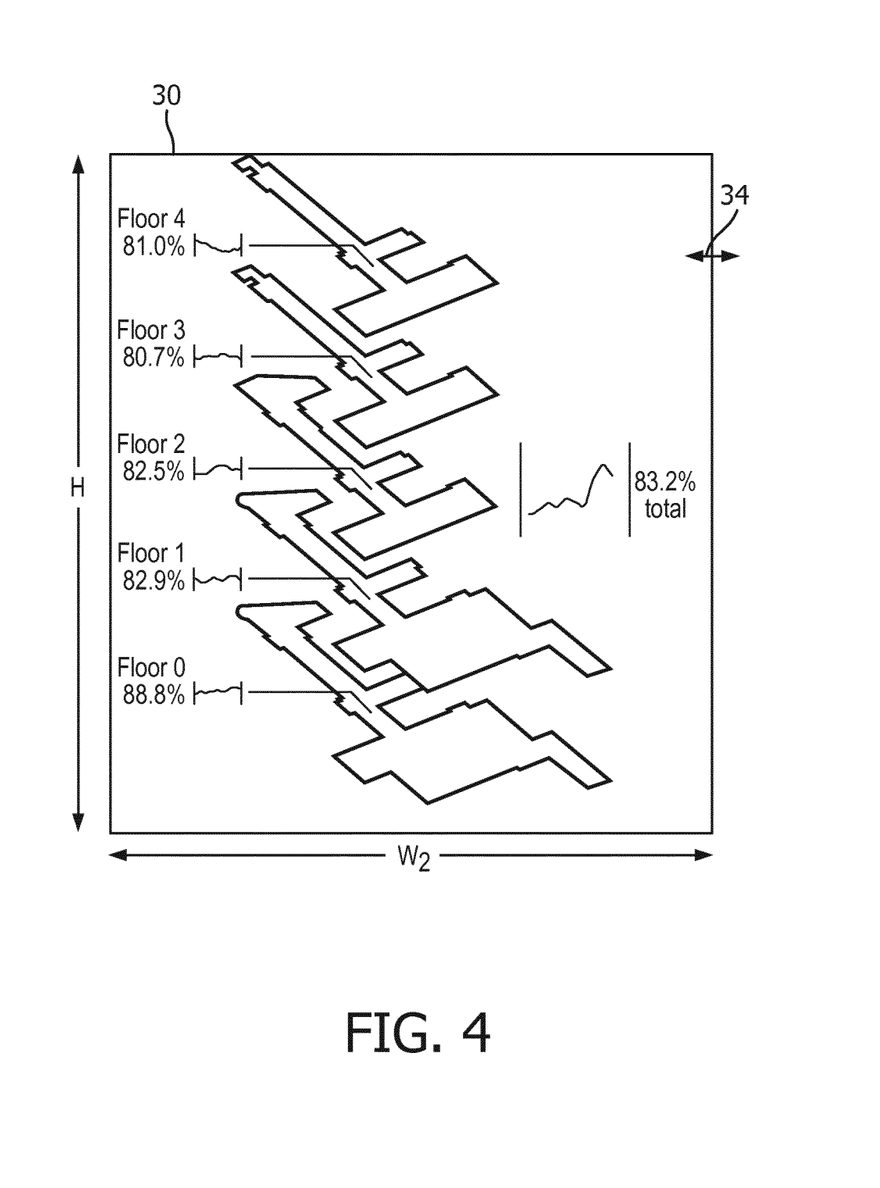
Figure 5:
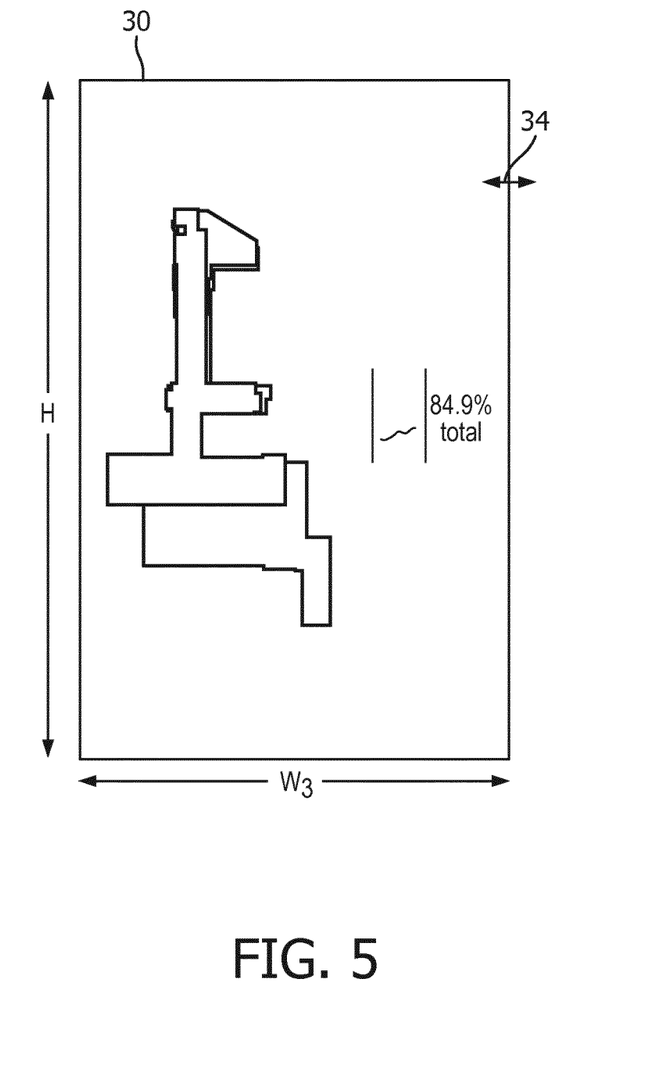

With reference to FIGS. 2-5, an example is shown of switching from rendering the information data set 22 comprising (in this example) an architectural floor plan for a building using the 3D rendering engine 42 (FIGS. 2-4) to using the 2D rendering engine 44 (FIG. 5). FIG. 2 shows the viewport 30 with a 3D rendering of the floor plan in the case of a viewport geometry having height "H" and width "$W_0$". The viewport geometry defined by height "H" and width "$W_0$" lies in the 3D viewport geometry space 52, and accordingly the 3D rendering engine 42 is used.

As further seen in FIG. 2, the user has clicked on the right edge of the viewport 30 to initiate a change in the width, as indicated by the horizontal double-arrowed cursor or icon 34. In each successive FIGS. 3, 4, and 5 the user is dragging the right edge of the viewport 30 more and more to the left, producing successively smaller width values of $W_1$ (FIG. 3), $W_2$ (FIG. 4), and finally $W_3$ (FIG. 5).

As seen in FIG. 3, the narrower width $W_1$ is accommodated by continuing to render the floor plan using the 3D rendering engine 42, but with the 3D rendering adjusted by reducing its overall width to stay within the narrowed width $W_1$ of the resized viewport 30 shown in FIG. 3. The 3D rendering engine 42 remains used because the viewport geometry defined by height "H" and width "$W_1$" still lies in the 3D viewport geometry space 52, and accordingly the 3D rendering engine 42 is used.

As seen in FIG. 4, the further-narrowed width $W_2$ is still accommodated by continuing to render the floor plan using the 3D rendering engine 42, but with the 3D rendering adjusted by further reducing its overall width to stay within the further-narrowed width $W_2$ of the resized viewport 30 shown in FIG. 4. Again, the viewport geometry defined by height "H" and width "$W_2$" still lies in the 3D viewport geometry space 52, and accordingly the 3D rendering engine 42 is used.

As seen in FIG. 5, the still further-narrowed width $W_3$ moves the (resized) viewport geometry into the 2D viewport geometry space 54, and accordingly the floor plan is now rendered using the 2D rendering engine 44. In other words, the viewport geometry defined by height "H" and width "$W_3$" now lies in the 2D viewport geometry space 54, and accordingly the 2D rendering engine 44 is used.

Figure 6:
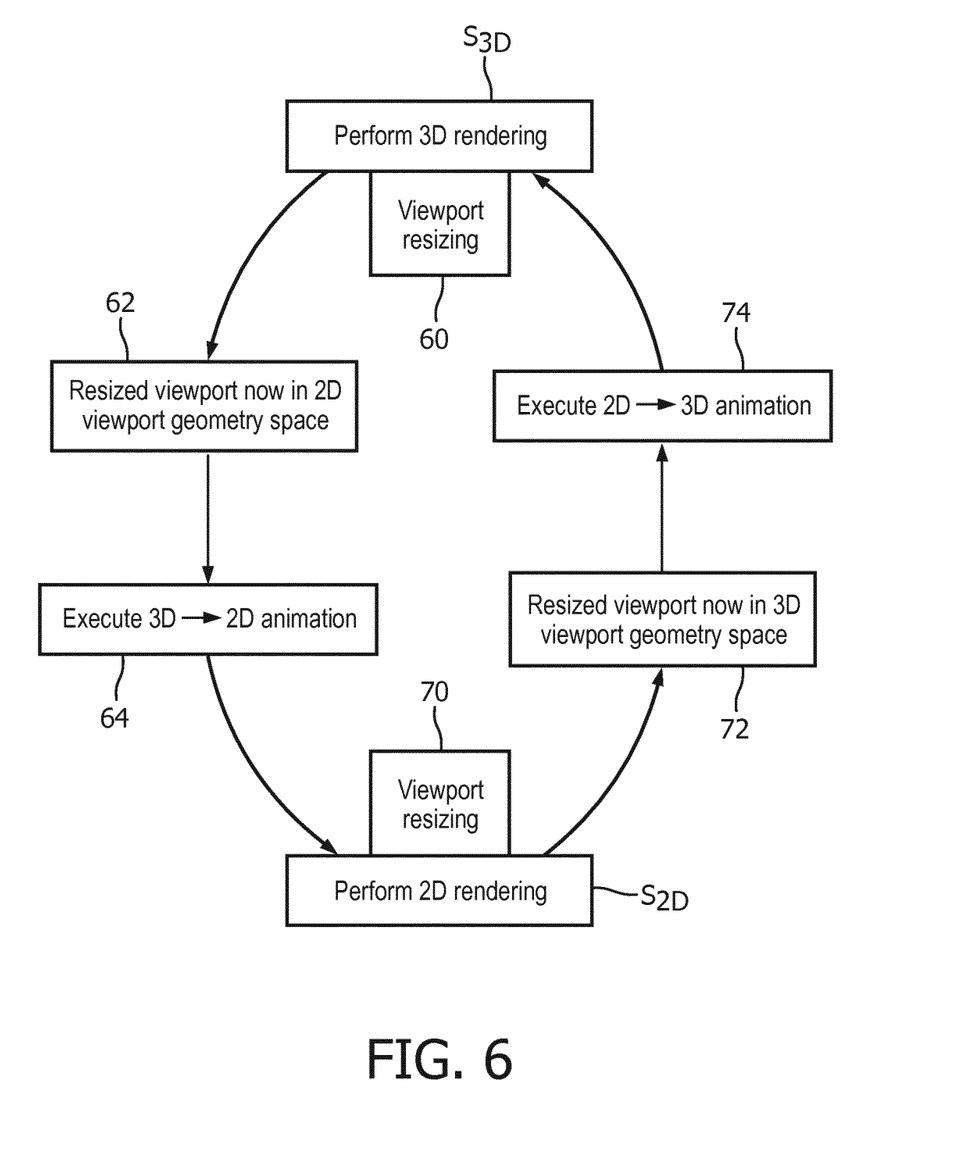
FIG. 6 diagrammatically shows a process flow diagram of handling by the computer of resizing of the viewport in accordance with input received via the one or more user input devices.

With reference to FIG. 6, an illustrative process flow of the information data set rendering process 40 in selecting the rendering engine to be used is shown. This example again assumes only two available rendering engines: the 3D rendering engine 42 and the 2D rendering engine 44. The discussion starts with the process 40 in a state $S_{3D}$ for which the viewport 30 has a geometry in the 3D viewport geometry space 52. In operation 60, the viewport 30 is resized, but the resized viewport remains in the 3D viewport geometry space 52; accordingly, the 3D rendering engine 42 continues to be used to render the information data set 22 and so the process 40 stays in the state $S_{3D}$.

In an operation 62, the user resizes the viewport 30 to a viewport geometry that is now in the 2D viewport geometry space 54. As a result, the process 40 transitions to a state Sm for which the viewport 30 has a geometry in the 2D viewport geometry space 54, and accordingly the process 40 now renders the information data set 22 using the 2D rendering engine 44. Optionally, the transition to the 2D rendering engine 44 is performed using a 3D→2D animation 64 (further described with reference to FIG. 7). In operation 70, the viewport 30 is resized, but the resized viewport remains in the 2D viewport geometry space 54; accordingly, the 2D rendering engine 44 continues to be used to render the information data set 22 and so the process 40 stays in the state $S_{2D}$.

In an operation 72, the user resizes the viewport 30 to a viewport geometry that is now back in the 3D viewport geometry space 52. As a result, the process 40 transitions back to the state $S_{3D}$ for which the viewport 30 has a geometry in the 3D viewport geometry space 52, and accordingly the process 40 now renders the information data set 22 using the 3D rendering engine 42. Optionally, the transition back to the 3D rendering engine 42 is performed using a 2D→3D animation 74 (further described with reference to FIG. 7). Thereafter, in the operation 60, the viewport 30 may continue to be resized, but so long as the resized viewport remains in the 3D viewport geometry space 52 the process 40 remains in the state $S_{3D}$; if the user resizes to a viewport geometry in the 2D viewport geometry space 54 then the flow again follows operations 62, 64 as previously described, and so forth.

Figure 7:
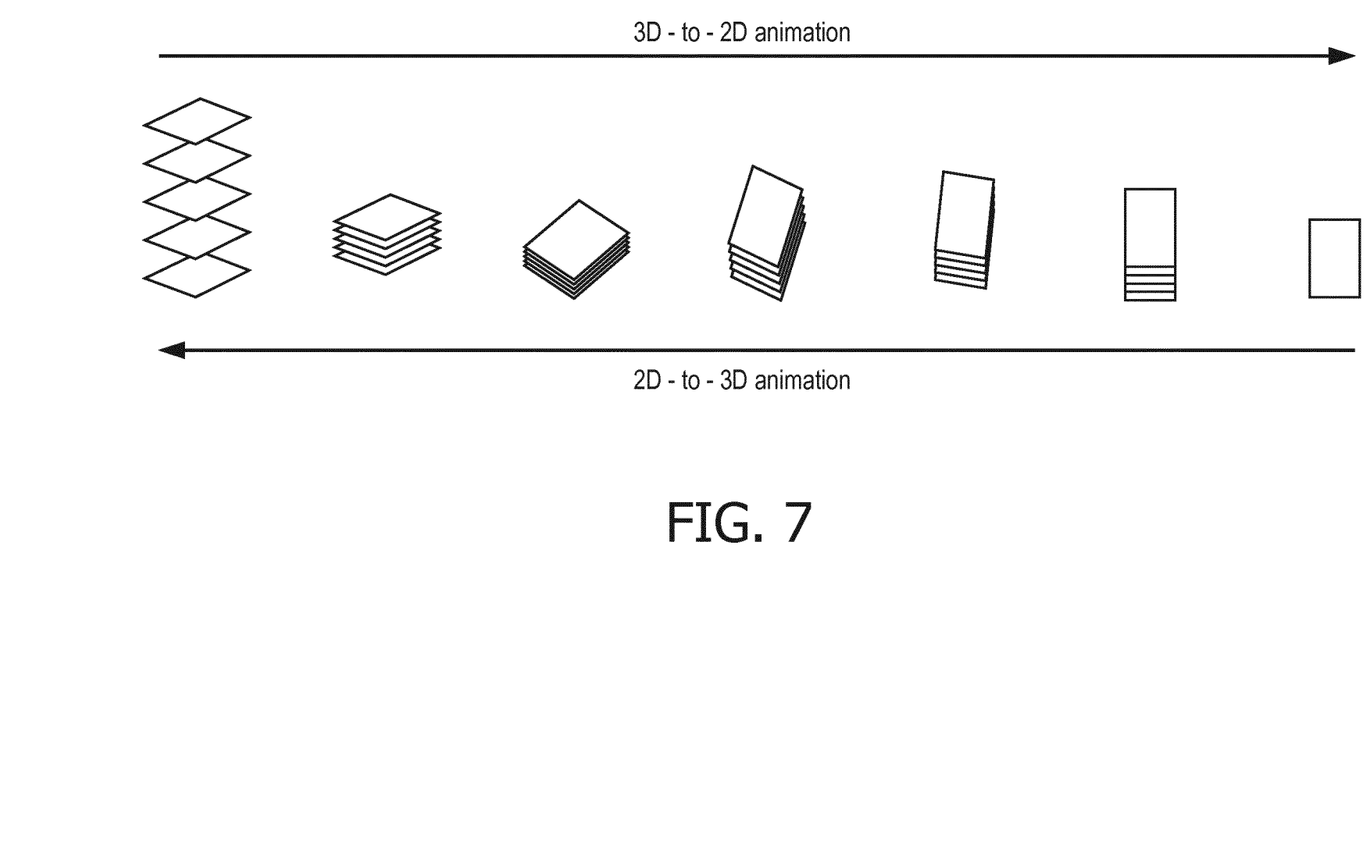
FIGS. 7 and 8 diagrammatically illustrate two examples of a time series of animation stills of an animation that is optionally used for transitioning from displaying the information data set in the viewport using a 3D rendering to displaying the information data set in the viewport using a 2D rendering; or vice versa.

With reference now to FIG. 7, an illustrative example of the animations 64, 74 of the flow of FIG. 6 are depicted by way of a time series of animation stills of an animation that is optionally used for transitioning from displaying the information data set 22 in the viewport 30 using the 3D rendering 42 to displaying the information data set in the viewport 30 using a 2D rendering 44; or vice versa. Specifically, the 3D→2D animation 64 is illustrated by the time series of animation stills running from left-to-right. The 2D→3D animation 74 is illustrated by the time series of animation stills running from right-to-left. The animation can be generated, for example, by using the 3D rendering engine 42 using different vantage points and different extents of compression along the vertical direction (for the illustrative example of a building floor plan), with the rightmost animation still being generated using the 2D rendering engine 44.

Figure 8:
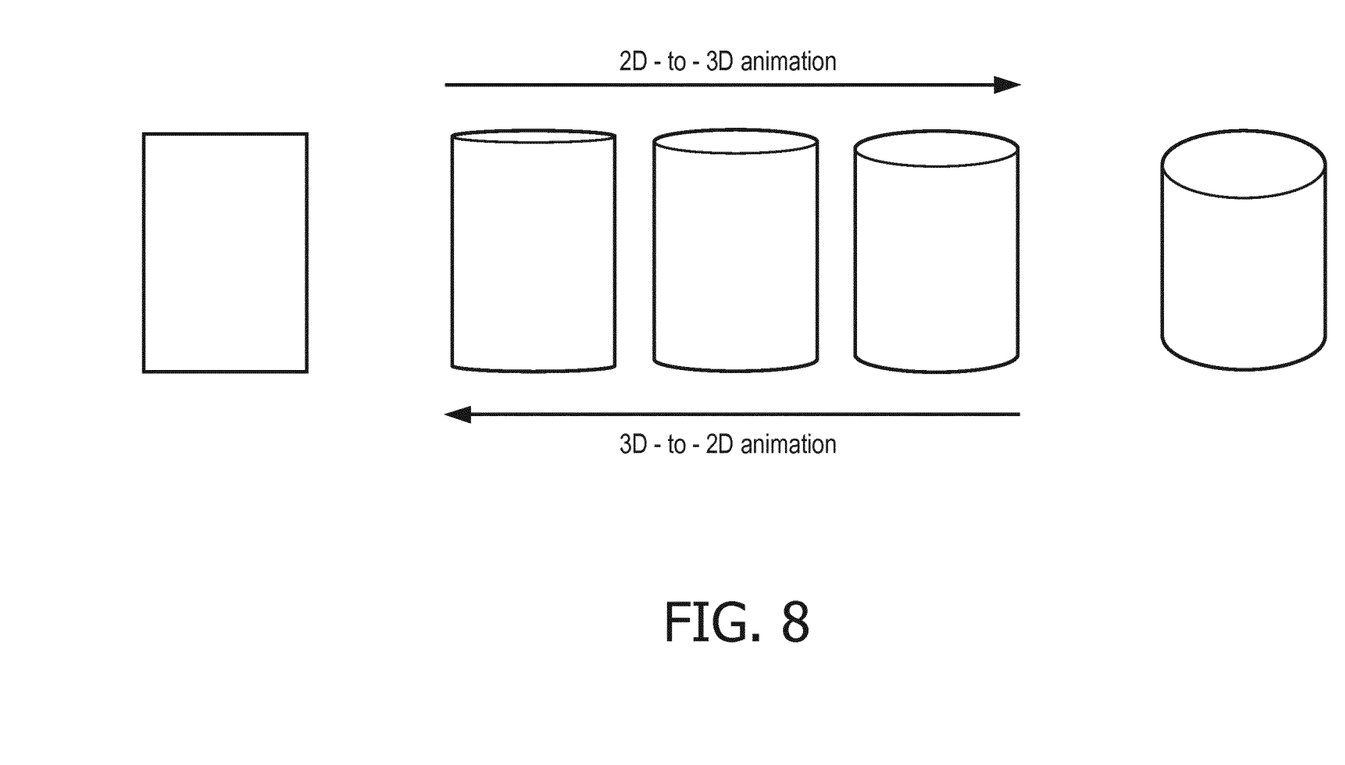
Figure 9:
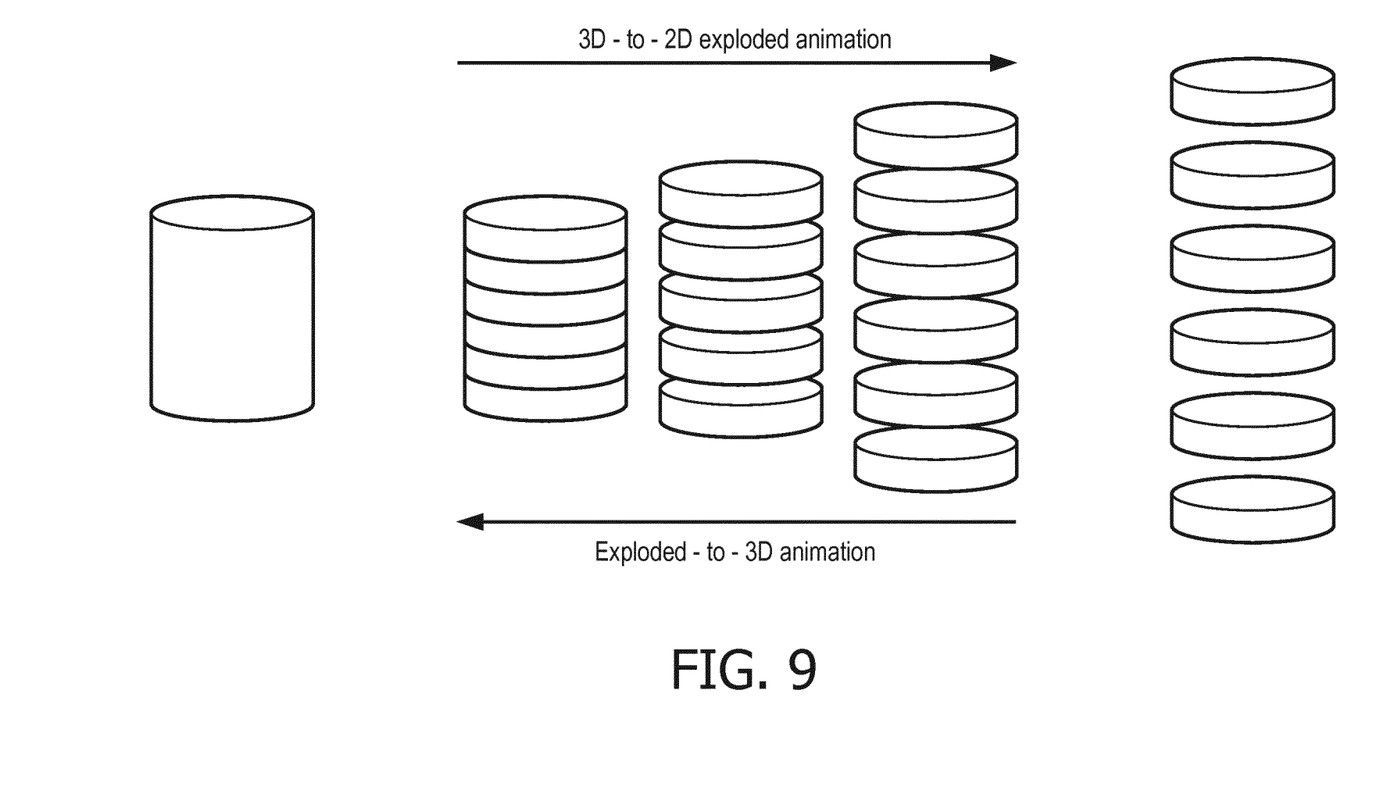
FIG. 9 diagrammatically illustrates a time series of animation stills of an animation that is optionally used for transitioning from displaying the information data set of the example of FIG. 8 in the viewport using a 3D rendering to displaying the information data set in the viewport using an exploded 3D rendering; or vice versa.

With reference to FIGS. 8 and 9, an illustrative example is shown for the information data set 22 being a 3D image of a cylinder in which the 3D image is made up of a stack of image slices oriented along the axis of the imaged cylinder. FIG. 8 shows animation stills equivalent to those of FIG. 7 but for the 3D cylinder image. In FIG. 8 the directions are reversed compared with FIG. 7, i.e. the 2D→3D animation runs from left-to-right while the 3D→2D animation runs from right-to-left.

FIG. 9 shows an illustrative example of animation stills for corresponding animations for the 3D-to-exploded 3D transition (running left-to-right) and for the exploded 3D-to-3D transition (running right-to-left). In this example, the exploded view shows the 2D image slices making up the 3D image in "exploded" view, i.e. spaced apart from one another.

The optional use of the animations 64, 74 has the advantage of providing the user with visual cues as to how the rendering is changing at each transition, and also has the advantage of providing smoother and more visually appealing transitions. However, the use of the animations 64, 74 is optional, and omitting the animations can provide faster and more computationally efficient processing.

In general, the various viewport geometry spaces 52, 54, 56 do not overlap. Alternatively, if some small overlap between adjacent spaces is provided, then the transition from a current rendering engine to a different rendering engine may be chosen by applying hysteresis, i.e. in the overlap region the current rendering engine is maintained.

The disclosed approaches can be used in the context of any information data set being rendered in a viewport that can be resized in accordance with user input. It is of particular value in embodiments in which the viewport is "read-only", i.e. where the GUI does not provide for the user to interact with the information data set shown in the viewport. The resizing of the viewport in response to user input serves as an indirect user input for deciding which rendering to use, and hence is of particular value in "read-only" embodiments that do not provide the user with any way to directly interact with the rendered data.

It will be appreciated that the disclosed computer processing may be physically embodied by the illustrative computer 10 programmed to perform such processing. It will be further appreciated that the disclosed computer processing may be physically embodied by a non-transitory storage medium storing instructions (e.g. programming) readable and executable by the illustrative computer 10 to perform such processing. The non-transitory storage medium may, for example, comprise a hard disk or other magnetic storage medium, an optical disk or other optical storage medium, a flash memory, solid state drive (SSD) or other electronic storage medium, various combinations thereof, or so forth.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A computer comprising:
a display;
a user input device; and
an electronic processor programmed to perform operations including:
visually summarizing individual components of an information data set having at least three dimensions in a viewport shown on the display using three-dimensional (3D) rendering when the viewport has a viewport geometry in a first viewport geometry space;
visually summarizing the individual components of the information data set in the viewport using two-dimensional (2D) rendering when the viewport has a viewport geometry in a second viewport geometry space;

resizing the viewport in response to input received via the user input device;

while visually summarizing the individual components of the information data set in the viewport using the 3D rendering, detecting resizing of the viewport to a viewport geometry in the second viewport geometry space and in response transitioning to displaying the visual summaries in the viewport using the 2D rendering wherein the transitioning includes displaying an animation starting at the 3D rendering and ending at the 2D rendering; and while visually summarizing the individual components of the information data set in the viewport using the 2D rendering, detecting resizing of the viewport to a viewport geometry in the first viewport geometry space and in response transitioning to displaying the visual summaries in the viewport using the 3D rendering wherein the transitioning includes displaying an animation starting at the 2D rendering and ending at the 3D rendering.

2. The computer of claim 1, wherein the first viewport geometry space and the second viewport geometry space are distinguished by criteria including one or more of:

a 3D/2D viewport area transition criterion;

a 3D/2D viewport width criterion; and a 3D/2D viewport height criterion.

3. The computer of claim 1, wherein the first viewport geometry space and the second viewport geometry space are distinguished by criteria dependent on size of the information data set.

4. The computer of claim 1, wherein the electronic processor is programmed to perform operations further including:

displaying the visual summaries in the viewport using a third type of rendering different from the 3D rendering and different from 2D rendering when the viewport has a viewport geometry in a third viewport geometry space;

while displaying the visual summaries in the viewport using the 3D rendering, detecting resizing of the viewport to a viewport geometry in the third viewport geometry space and in response transitioning to displaying the visual summaries in the viewport using the third type of rendering; and while displaying the visual summaries in the viewport using the third type of rendering, detecting resizing of the viewport to a viewport geometry in the first viewport geometry space and in response transitioning to displaying the visual summaries in the viewport using the 3D rendering.

5. The computer of claim 4, wherein:

the third type of rendering comprises an exploded three-dimensional (3D) rendering.

6. The computer of claim 1, wherein:

the electronic processor is not programmed to enable the user to interact via the user input device with the display of the visual summaries in the viewport using the 3D rendering; and the electronic processor is not programmed to enable the user to interact via the user input device with the display of the visual summaries in the viewport using the 2D rendering.

7. The computer of claim 1, wherein the electronic processor is programmed to perform operations further including:

performing a process outputting the information data set.

8. The computer of claim 7, wherein the process comprises a three-dimensional image acquisition process, and the information data set comprises a 3D image.

9. The computer of claim 7, wherein the process comprises a computer-aided drafting (CAD) process, and the information data set comprises a 3D CAD drawing.

10. The computer of claim 7, wherein the process comprises a statistical data analysis process, and the information data set comprises statistical data set having at least three dimensions.

11. The computer of claim 1, wherein the process comprises retrieving the information data set from a non-transitory storage medium.

12. The computer of claim 1, wherein the viewport is a read only viewport that does not permit user interaction with content displayed in the viewport.

13. A non-transitory storage medium storing instructions readable and executable by a computer having a display and a user input device to perform operations including:

performing a process outputting an information data set having individual components and at least three dimensions;

displaying and visually summarizing the individual components of the information data set in a viewport shown on the display using a three-dimensional (3D) rendering wherein the viewport has a viewport geometry in a 3D viewport geometry space; and while displaying and visually summarizing the individual components of the information dataset in the viewport using the 3D rendering, resizing the viewport to a resized viewport geometry in response to input received via the user input device and one of:

adjusting the displaying and visual summarizing of the individual components of information data set in the viewport using the 3D rendering to accommodate the resized viewport geometry if the resized viewport geometry remains in the 3D viewport geometry space including displaying an animation starting at the 3D rendering and ending at the 2D rendering, or displaying and visually summarizing individual components of the information data set in the viewport using a two dimensional (2D) rendering if the resized viewport geometry is in a 2D viewport geometry space including displaying an animation starting at the 2D rendering and ending at the 3D rendering.

* * * * *